US012706304B2

(12) United States Patent
Gu et al.

(10) Patent No.: US 12,706,304 B2
(45) Date of Patent: Aug. 11, 2026

(54) METHODS FOR FABRICATING PRE-LITHIATED, TWO-DIMENSIONAL ANODE MATERIALS

(71) Applicant: GM GLOBAL TECHNOLOGY OPERATIONS LLC, Detroit, MI (US)

(72) Inventors: Yuntao Gu, Farmington Hills, MI (US); Jeffrey David Cain, Royal Oak, MI (US); Sayed Youssef Sayed Nagy, Troy, MI (US); Nicholas Paul William Pieczonka, Windsor (CA); Thomas E. Moylan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1037 days.

(21) Appl. No.: 17/840,928

(22) Filed: Jun. 15, 2022

(65) Prior Publication Data

US 2023/0411610 A1 Dec. 21, 2023

(51) Int. Cl.
*H01M 4/38* (2006.01)
*H01M 4/36* (2006.01)
*H01M 4/02* (2006.01)

(52) U.S. Cl.
CPC ........... *H01M 4/386* (2013.01); *H01M 4/366* (2013.01); *H01M 2004/027* (2013.01)

(58) Field of Classification Search
None
See application file for complete search history.

(56) References Cited

U.S. PATENT DOCUMENTS 6,916,744 B2 7/2005 Achutharaman et al.
8,440,350 B1 5/2013 Verbrugge et al.
8,859,144 B2 10/2014 Xiao
8,999,584 B2 4/2015 Jiang et al.
9,005,811 B2 4/2015 Xiao et al.
9,093,705 B2 7/2015 Xiao et al.
9,142,830 B2 9/2015 Xiao et al.
9,178,208 B2 11/2015 Park et al.
9,302,914 B2 4/2016 Liu et al.
9,362,551 B2 6/2016 Sachdev et al.
9,379,374 B2 6/2016 Liu et al.
9,397,338 B2 7/2016 Park et al.
9,531,004 B2 12/2016 Xiao et al.
9,553,303 B2 1/2017 Park et al.
9,564,639 B2 2/2017 Huang
9,570,752 B2 2/2017 Huang et al.
9,577,251 B2 2/2017 Xiao et al.
9,583,757 B2 2/2017 Park et al.
9,780,361 B2 10/2017 Xiao et al.
9,806,328 B2 10/2017 Park et al.
10,062,898 B2 8/2018 Xiao
10,797,303 B2 10/2020 Cho et al.
10,797,312 B2 10/2020 Cho et al.
11,011,742 B2 5/2021 Sachdev et al.
11,316,142 B2 4/2022 Jiang et al.
11,342,545 B2 5/2022 Cain et al.
11,349,119 B2 5/2022 Halalay et al.
11,374,218 B2 6/2022 Jiang et al.
11,420,139 B2 8/2022 Jiang et al.
11,824,198 B2 11/2023 Son et al.
2006/0040182 A1 2/2006 Kawakami et al.
2008/0050573 A1 2/2008 Nakano et al.
2012/0251895 A1 10/2012 Mun et al.
2013/0327648 A1 12/2013 Grant et al.
2014/0065488 A1 3/2014 Lee et al.
2014/0295273 A1 10/2014 Mah et al.
2015/0118559 A1 4/2015 Ito et al.
2015/0162596 A1* 6/2015 Dadheech ............ H01M 4/136 429/231.95
2015/0372297 A1 12/2015 Kameyama et al.
2015/0380724 A1 12/2015 Chan (Continued)

FOREIGN PATENT DOCUMENTS

CN 1802733 A 7/2006
CN 107210433 A 9/2017

(Continued)

OTHER PUBLICATIONS

Efficient Synthesis of Orthorhombic Lithium Borate Hydroxide Micro Rods and Their Thermal Conversion to Lithium Borate, Wancheng Zhu, Liyun Zhang, Xiii Cui, Qiang Zhang, (Year: 2011).
Wolfenstine, J. “CaSi2 as an anode for lithium-ion batteries.” Journal of power sources 124.1 (2003): 241-245. (Year: 2003).
Castillo, Sarah M ., et al. “Lattice dynamics of the rhombohedral polymorphs of CaSi2.” Inorganic Chemistry 55.20 (2016): 10203-10207. (Year: 2016).
Y. Tzeng et al Nanomaterials, 10, (2020) 2467, 1-13. (Year: 2020).
First Office Action for German Patent Application No. 102022128084.5 issued on Mar. 25, 2025, with correspondence from Manitz Finsterwald Patent—und Rechtsanwaltspartnerschaft mbB summarizing Office Action; 5 pages.

(Continued)

*Primary Examiner* — Tanisha Diggs

(74) *Attorney, Agent, or Firm* — Harness, Dickey & Pierce, P.L.C.

(57) ABSTRACT

The present disclosure provides a method for forming a pre-lithiated layered anode material. The method includes removing cations from a precursor material including a layered ionic compound to form creates a two-dimensional structure that defines a layered anode material. The method further includes inserting lithium ions using an anion insertion wet-chemical process into the layered anode materials to form the pre-lithiated layered anode material. The anion insertion wet-chemical process can be the same as or different form the cation extraction wet-chemical process. In each instance, the precursor material is be represented by $MX_2$, where M is one of calcium (Ca) and magnesium (Mg) and X is one of silicon (Si), germanium (Ge), and boron (B) and the precursor material has alternating layers of M and X.

8 Claims, 3 Drawing Sheets

(56) References Cited

U.S. PATENT DOCUMENTS

| | | | | |
|---|---|---|---|---|
| 2016/0006024 | A1* | 1/2016 | Xiao .................. | H01M 4/0402 429/231.1 |
| 2017/0162859 | A1 | 6/2017 | Yang et al. | |
| 2017/0179482 | A1 | 6/2017 | Verbrugge et al. | |
| 2018/0062153 | A1 | 3/2018 | Zhu et al. | |
| 2018/0083268 | A1 | 3/2018 | Huang | |
| 2018/0205114 | A1 | 7/2018 | Pauric et al. | |
| 2018/0248175 | A1 | 8/2018 | Ghezelbash et al. | |
| 2019/0067675 | A1 | 2/2019 | Xiao | |
| 2019/0088922 | A1 | 3/2019 | Zhamu et al. | |
| 2019/0088930 | A1 | 3/2019 | Zhamu et al. | |
| 2019/0148772 | A1 | 5/2019 | Park et al. | |
| 2019/0181426 | A1 | 6/2019 | Park et al. | |
| 2019/0305298 | A1 | 10/2019 | Chae et al. | |
| 2019/0386314 | A1 | 12/2019 | Lanning et al. | |
| 2020/0014026 | A1 | 1/2020 | Song et al. | |
| 2020/0119339 | A1 | 4/2020 | Halalay et al. | |
| 2020/0350558 | A1 | 11/2020 | Jimenez et al. | |
| 2020/0388825 | A1 | 12/2020 | Verbrugge et al. | |
| 2021/0050597 | A1 | 2/2021 | Lin et al. | |
| 2021/0057752 | A1 | 2/2021 | Jiang et al. | |
| 2021/0075001 | A1 | 3/2021 | Oleshko et al. | |
| 2021/0078012 | A1 | 3/2021 | Kochhar et al. | |
| 2021/0083264 | A1 | 3/2021 | Jiang et al. | |
| 2021/0135194 | A1 | 5/2021 | Wang et al. | |
| 2021/0175486 | A1 | 6/2021 | Cain et al. | |
| 2021/0184199 | A1 | 6/2021 | He et al. | |
| 2021/0218016 | A1 | 7/2021 | Chae et al. | |
| 2022/0029156 | A1 | 1/2022 | Thackeray et al. | |
| 2022/0384773 | A1 | 12/2022 | Cain et al. | |
| 2022/0384774 | A1 | 12/2022 | Cain et al. | |
| 2022/0384776 | A1 | 12/2022 | Cain et al. | |
| 2023/0060634 | A1 | 3/2023 | Moylan et al. | |
| 2023/0101215 | A1 | 3/2023 | Yu et al. | |

FOREIGN PATENT DOCUMENTS

| | | | |
|---|---|---|---|
| CN | 107431192 | A | 12/2017 |
| CN | 106784763 | B | 3/2019 |
| CN | 109994717 | A | 7/2019 |
| CN | 110024048 | A | 7/2019 |
| CN | 110600688 | A | 12/2019 |
| CN | 111048747 | A | 4/2020 |
| CN | 112928241 | A | 6/2021 |
| CN | 112952184 | A | 6/2021 |
| CN | 113644249 | A | 11/2021 |
| CN | 115440945 | A | 12/2022 |
| CN | 115440947 | A | 12/2022 |
| CN | 115440970 | A | 12/2022 |
| CN | 115744918 | A | 3/2023 |
| CN | 115881946 | A | 3/2023 |
| CN | 117276486 | A | 12/2023 |
| DE | 102019115818 | A1 | 4/2020 |
| DE | 102020129335 | A1 | 6/2021 |
| DE | 102022108412 | A1 | 12/2022 |
| DE | 102022108463 | A1 | 12/2022 |
| DE | 102022108466 | A1 | 12/2022 |
| DE | 102022119823 | A1 | 3/2023 |
| DE | 102022120235 | A1 | 3/2023 |
| DE | 102022128084 | A1 | 12/2023 |
| WO | 2018032975 | A1 | 2/2018 |
| WO | 2020009494 | A1 | 1/2020 |

OTHER PUBLICATIONS

Assresahegn, Birhanu Desalegn et al., "Effects of the Formulations of Silicon-Based Composite Anodes on their Mechanical, Storage, and Electrochemical Properties," <i>ChemSusChem</i>, 2017, 10, pp. 4080-4089, Published online: Sep. 25, 2017, DOI: 10.1002/cssc.201701281.

Cao, Peng-Fei et al., "Superstretchable, Self-Healing Polymeric Elastomers with Tunable Properties," <i>Adv. Funct. Mater .</i>, 2018, 28, 1800741, 9 pages, Published online: Apr. 16, 2018, DOI: 10.1002/adfm.201800741.

Cheng, Yong et al., "Influence of copper addition for silicon-carbon composite as anode materials for lithium ion batteries," <i>RSC Adv. </i>, 2016, 6, pp. 56756-56764, Published online: Jun. 8, 2016, DOI: 10.1039/c6ra12332e.

Choi, Min-Jae et al., "Novel strategy to improve the Li-storage performance of micro silicon anodes," <i>Journal of Power Sources</i>, 2017, 348, pp. 302-310, Published online Mar. 10, 2017, DOI: 10.1016/j.jpowsour.2017.03.020.

Gómez-Cámer, Juan Luis et al., "Anchoring Si nanoparticles to carbon nanofibers: an efficient procedure for improving SI performance in Li batteries," <i>J. Mater. Chem. </i>, 2011, 21, pp. 811-818, Published Nov. 8, 2010, DOI: 10.1039/c0jm01811b.

Hassan, Fathy M. et al., "Engineered Si Electrode Nanoarchicture: A Scalable Postfabrication Treatment for the Production of Next-Generation Li-Ion Batteries," <i>Nano Lett. </i>, 2014, 14, pp. 277-283, Published Dec. 12, 2013, DOI: 10.1021/nl403943g.

Huang, Xingkang et al., "Improved Cyclic Performacne of Si Anodes for Lithium-Ion Batteries by Forming Intermetallic Interphases between Si Nanoparticles and Metal Microparticles," <i>ACS Appl. Mater. Interfaces</i>, 2013, 5, pp. 11965-11970, Published Oct. 21, 2013, DOI: 10.1021/am403718u.

Jeong, You Kyeong et al., "Mussel-Inspired Coating and Adhesion for Rechargeable Batteries: A Review," <i>ACS Appl. Mater. Interfaces</i>, 2018, 10, pp. 7562-7573, Published online: Sep. 22, 2017, DOI: 10.1021/acsami.7b08495.

Jia, Haiping et al., "A novel approach to synthesize micrometer-sized porous silicon as a high performance anode for lithium-on batteries," <i>Nano Energy</i>, 2018, 50, pp. 589-597, Published online: May 21, 2018, DOI: 10.1016/j.nanoen.2018.05.048.

Joyce, Christopher et al., "Metallic Copper Binders for Lithium-Ion Battery Silicon Electrodes," <i>Journal of the Electrochemical Society</i>, 2012, 159 (6), pp. A909-A914, Published May 2, 2012, DOI: 10.1149/2.107206jes.

Kim, Donghyuk et al., "Freestanding silicon microparticle and self-healing polymer composite design for effective lithiation stress relazation," <i>J. Mater. Chem. A</i>, 2016, 6, pp. 11353-11361, Publsihed Jun. 4, 2018, DOI: 10.1039/c7ta11269f.

Kim, Jae Woo et al., "Improvement of silicon powder negative electrodes by copper electroless deposition for lithium secondary batteries," <i>Journal of Power Sources</i>, 2005, 147, pp. 227-233, Published online: Feb. 25, 2005, DOI: 10.1016/j.jpowsour.2004.12.041.

Leblanc, Dominic et al., "Silicon as anode for high-energy lithium ion batteries: From molten ingot to nanoparticles," <i>Journal of Power Sources</i>, 2015, 299, pp. 529-536, Published online: Sep. 21, 2015, DOI: 10.1016/j.powsour.2015.09.040.

Lestriez, B. et al., "Hierarchical and Resilient Conductive Network of Bridged Carbon Nanotubes and Nanofibers for High-Energy Si Negative Electrodes," <i>Electrochemical and Solid-State Letters</i>, 2009, 12, 4, pp. A76-A80.

Lu, Zhenda et al., "Nonfilling Carbon Coaring of Porous Silicon Micrometer-Sized Particles for High-Performacne Lithium Battery Anodes," <i>ACS Nano</i>, 2015, 9, pp. 2540-2547, Published online Mar. 4, 2015, DOI: 10.1021/nn505410q.

Mazouzi, Driss et al., "Very High Surface Capacity Observed Using Si Negative Electrodes Embedded in Copper Foam as 3D Current Collectors," <i>Adv. Energy Mater. </i>, 2014, 4, 1301718, 13 pages, Published online: Feb. 13, 2014, DOI: 10.1002/aenm.201301718.

Munaoka, Takatoshi et al., "Ionically Conductive Self-Healing Binder for Low Cost Si Microarticles Anodes in Li-Ion Batteries," <i>Adv. Energy Mater. </i>, 2018, 8, 1703138, 11 pages, Published online: Feb. 12, 2018, DOI: 10.1002/aenm.201703138.

Polat, B.D. et al., "Improving Si anode Performance by Forming Copper Capped Copper-Silicon Thin Film Anodes for Rechargeable Lithium Ion Batteries," <i>Electrochimica Acta</i>, 2015, 170, pp. 63-71, Published online Apr. 25, 2015, DOI: 10.1013/j.electacta.2015.04.131.

Sethuraman, Vijay A. et al., "Increased cycling efficiency and rate capability of copper-coated silicon anodes lin lithium-ion batteries," <i>Journal of Power Sources</i>, 2011, 196, pp. 393-398, Published online Jun. 23, 2010, DOI: 10.1016/j.powsour.2010.06.043.

(56) References Cited

OTHER PUBLICATIONS

Wang, Chao et al., "Self-healing chemistry enables the stable operation of silicon microparticle anodes for high-energy lithium-ion batteries," <i>Nature Chemistry</i>, 2013, 5, pp. 1042-1048, Published online Nov. 17, 2013, DOI: 10.1038/nchem.1802.

Wang, Jing et al., "Encapsulating micro-nano Si/SiOx.into conjugated nitrogen-doped carbon as binder-free monolithic anodes for advanced lithium ion batteries," <i>Nanoscale</i>, 2015, 7, pp. 8023-8034, Published Mar. 23, 2015, DOI: 10.1039/5nr01209k.

Yoon, Sukeun et al., "Enhancement of capacity of carbon-coated Si—Cu3Si composite anode using metal-organic compound for lithium-ion batteries," <i>Journal of Power Sources</i>, 2006, 161, pp. 1319-1323, Published online: Jul. 24, 2006, DOI: 10.1016/j.jpowsour.2006.06.035.

First Office Action for Chinese Patent Application No. 202211046787.6 issued on Dec. 1, 2023, with correspondence from China Patent Agent (H.K.) Ltd. summarizing Office Action; 12 pages.

Halalay, Ion C. et al., U.S. Appl. No. 16/160,799, filed Oct. 15, 2018 entitled, "Method for Making Silicon-Containing Composite Electrodes for Lithium-Based Batteries," 47 pages.

Cain, Jeffrey D. et al., U.S. Appl. No. 16/706,331, filed Dec. 6, 2019 entitled, "Methods of Lithiating Electroactive Materials," 50 pages.

Cain, Jeffrey David et al.; U.S. Appl. No. 17/335,972, filed Jun. 1, 2021, entitled "Electrochemical Exchange For The Fabrication Of A Layered Anode Material," 51 pages.

Cain, Jeffrey David et al.; U.S. Appl. No. 17/336,073, filed Jun. 1, 2021, entitled "Layered Anode Materials," 36 pages.

Moylan, Thomas E. et al.; U.S. Appl. No. 17/465,012, filed Sep. 2, 2021, entitled "Methods for Fabricating Two-Dimensional Anode Materials," 49 pages.

First Office Action for Chinese Patent Application No. 202211355091.1 issued May 13, 2026, with correspondence from China Patent Agent (H.K.) Ltd summarizing Office Action; 11 pages.

Wu Yong et al.; "Green Secondary Battery Advanced Technology Series: New System of Light Element Multi-Electron Secondary Batteries"; Beijing Institute of Technology Press; Mar. 1, 2022; pp. 179-180.

* cited by examiner

METHODS FOR FABRICATING PRE-LITHIATED, TWO-DIMENSIONAL ANODE MATERIALS

INTRODUCTION

This section provides background information related to the present disclosure which is not necessarily prior art.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator filled with a liquid or solid electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte (or solid-state separator), the solid-state electrolyte (or solid-state separator) may physically separate the electrodes so that a distinct separator is not required.

Conventional rechargeable lithium-ion batteries operate by reversibly passing lithium ions back and forth between the negative electrode and the positive electrode. For example, lithium ions may move from the positive electrode to the negative electrode during charging of the battery, and in the opposite direction when discharging the battery. Such lithium-ion batteries can reversibly supply power to an associated load device on demand More specifically, electrical power can be supplied to a load device by the lithium-ion battery until the lithium content of the negative electrode is effectively depleted. The battery may then be recharged by passing a suitable direct electrical current in the opposite direction between the electrodes.

During discharge, the negative electrode may contain a comparatively high concentration of intercalated lithium, which is oxidized into lithium ions and electrons. Lithium ions may travel from the negative electrode to the positive electrode, for example, through the ionically conductive electrolyte solution contained within the pores of an interposed porous separator. Concurrently, electrons pass through an external circuit from the negative electrode to the positive electrode. Such lithium ions may be assimilated into the material of the positive electrode by an electrochemical reduction reaction. The battery may be recharged or regenerated after a partial or full discharge of its available capacity by an external power source, which reverses the electrochemical reactions that transpired during discharge.

Many different materials may be used to create components for a lithium ion battery. For example, positive electrode materials for lithium batteries typically comprise an electroactive material which can be intercalated with lithium ions, such as lithium-transition metal oxides or mixed oxides, for example including $LiMn_2O_4$, $LiCoO_2$, $LiNiO_2$, $LiMm_{1.5}Ni_{0.5}O_4$, $LiNi_{(1-x-y)}Co_xM_yO_2$ (where 0<x<1, y<1, and M may be Al, Mn, or the like), or one or more phosphate compounds, for example including lithium iron phosphate or mixed lithium manganese-iron phosphate. The negative electrode typically includes a lithium insertion material or an alloy host material. For example, typical electroactive materials for forming an anode include graphite and other forms of carbon, silicon and silicon oxide, tin, and tin alloys.

Certain anode materials have particular advantages. While graphite having a theoretical specific capacity of 372 mAh $g^{-1}$ is most widely used in lithium-ion batteries, anode materials with high specific capacity, for example high specific capacities ranging about 900 mAh $g^{-1}$ to about 4,200 mAh·$g^{-1}$, are of growing interest. For example, silicon has the highest known theoretical capacity for lithium (e.g., about 4,200 mAh·$g^{-1}$), making it an appealing material for rechargeable lithium ion batteries. However, anodes comprising silicon may suffer from drawbacks. For example, excessive volumetric expansion and contraction (e.g., about 400% for silicon as compared to about 10% for graphite) during successive charging and discharging cycles. Such volumetric changes may lead to fatigue cracking and decrepitation of the electroactive material, as well as pulverization of material particles, which in turn may cause a loss of electrical contact between the silicon-containing electroactive material and the rest of the battery cell resulting in poor capacity retention and premature cell failure. This is especially true at electrode loading levels required for the application of silicon-containing electrodes in high-energy lithium-ion batteries, such as those used in transportation applications. Accordingly, it would be desirable to develop high performance electrode materials, particularly comprising silicon and/or other electroactive materials that undergo significant volumetric changes during lithium ion cycling, and methods for preparing such high performance electrodes materials, for use in high energy and high power lithium ion batteries, that can address these challenges.

SUMMARY

This section provides a general summary of the disclosure, and is not a comprehensive disclosure of its full scope or all of its features.

The present disclosure relates to layered anode materials, to electrochemical cells including the same, and also, to methods of forming and using the same.

In various aspects, the present disclosure provides a method for forming a pre-lithiated layered anode material. The method includes removing cations from a precursor material using a cation extraction wet-chemical process. The precursor material includes a layered ionic compound, and the removing cations creates a two-dimensional structure that defines a layered anode material. The method further includes inserting lithium ions using an anion insertion wet-chemical process into the layered anode materials to form the pre-lithiated layered anode material. The anion insertion wet-chemical process may be the same as or different form the cation extraction wet-chemical process.

In one aspect, the precursor material may be represented by $MX_2$, where M is one of calcium (Ca) and magnesium (Mg) and X is one of silicon (Si), germanium (Ge), and boron (B) and the precursor material has alternating layers of M and X.

In one aspect, the cation extraction wet-chemical process and the anion insertion wet-chemical process may be the same and may include contacting the precursor material with a buffer solution. The buffer solution may include a lithium ion precursor and an alcohol. The contacting of the precursor material to the buffer solution may cause the cations to be removed from the precursor material to form the layered anode material and lithium ions to concurrently move into the layered anode material to form the pre-lithiated layered anode material.

In one aspect, the lithium ion precursor may be selected from the group consisting of: lithium hydroxide (LiOH), lithium chloride (LiCl), lithium methoxide ($LiCH_3O$), lithium ethoxide ($LiOC_2H_5$), lithium nitrate ($LiNO_3$), and combinations thereof.

In one aspect, the alcohol may be selected from the group consisting of: ethanol, methanol, isopropanol, and combinations thereof.

In one aspect, the buffer solution may include a solvent selected from the group consisting of: dimethyl carbonate (DMC), acetyl nitrite, and combinations thereof.

In one aspect, the method may further include applying a vacuum at a temperature greater than or equal to about 25° C. to less than or equal to about 80° C. to the pre-lithiated layered anode material to remove residual solvent.

In one aspect, the method may further include rinsing the pre-lithiated layered anode material with a solvent to remove residual lithium ion precursor and the cations.

In one aspect, the cation extraction wet-chemical process and the anion insertion wet-chemical process may be different. The cation extraction wet-chemical process may include contacting the precursor material with acidic solution to remove cations from the precursor material to form the layered anode material. The anion insertion wet-chemical process may include contacting the layered anode material with a basic solution comprising a lithium ion precursor to form the pre-lithiated layered anode material.

In one aspect, the acidic solution may have a pH less than or equal to about 1.

In one aspect, the acidic solution may include hydrochloric acid (HCl), nitric acid ($HNO_3$), or a combination of hydrochloric acid (HCl) and nitric acid ($HNO_3$), In one aspect, the lithium ion precursor may be selected from the group consisting of: lithium hydroxide (LiOH), lithium chloride (LiCl), lithium methoxide ($LiCH_3O$), lithium ethoxide ($LiOC_2H_5$), lithium nitrate ($LiNO_3$), and combinations thereof.

In one aspect, the basic solution may have a pH greater than or equal to about 10.

In various aspects, the present disclosure provides a method for forming a pre-lithiated layered anode material. The method may include contacting a precursor material with a buffer solution. The precursor material may include a layered ionic compound. The buffer solution may include one or more lithium ion precursors and one or more alcohols. The contacting of the precursor material to the buffer solution may cause cations to be removed from the precursor material to form a layered anode material and lithium ions to concurrently move into the layered anode material to form the pre-lithiated layered anode material.

In one aspect, the lithium ion precursor may be selected from the group consisting of: lithium hydroxide (LiOH), lithium chloride (LiCl), lithium methoxide ($LiCH_3O$), lithium ethoxide ($LiOC_2H_5$), lithium nitrate ($LiNO_3$), and combinations thereof, and the alcohol may be selected from the group consisting of: ethanol, methanol, isopropanol, and combinations thereof.

In one aspect, the buffer solution may include a solvent selected from the group consisting of: dimethyl carbonate (DMC), acetonitrile, and combinations thereof.

In one aspect, the method may further include applying a vacuum at a temperature greater than or equal to about 25° C. to less than or equal to about 80° C. to the pre-lithiated layered anode material to remove residual solvent.

In one aspect, the method may further include rinsing the pre-lithiated layered anode material with a solvent to remove residual lithium ion precursors and the cation-containing content.

In various aspects, the present disclosure provides a method for forming a pre-lithiated layered anode material. The method may include contacting a precursor material including a layered ionic compound with an acidic solution to remove cations and form a layered anode material. The method further includes contacting the layered anode material with a basic solution including a lithium ion precursor to form the pre-lithiated layered anode material.

In one aspect, the acidic solution may include hydrochloric acid (HCl), nitric acid ($HNO_3$), or a combination of hydrochloric acid (HCl) and nitric acid ($HNO_3$), and may have a pH less than or equal to about 1. The basic solution may have a pH greater than or equal to about 10. The lithium ion precursor may be selected from the group consisting of: lithium hydroxide (LiOH), lithium chloride (LiCl), lithium methoxide ($LiCH_3O$), lithium ethoxide ($LiOC_2H_5$), lithium nitrate ($LiNO_3$), and combinations thereof.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
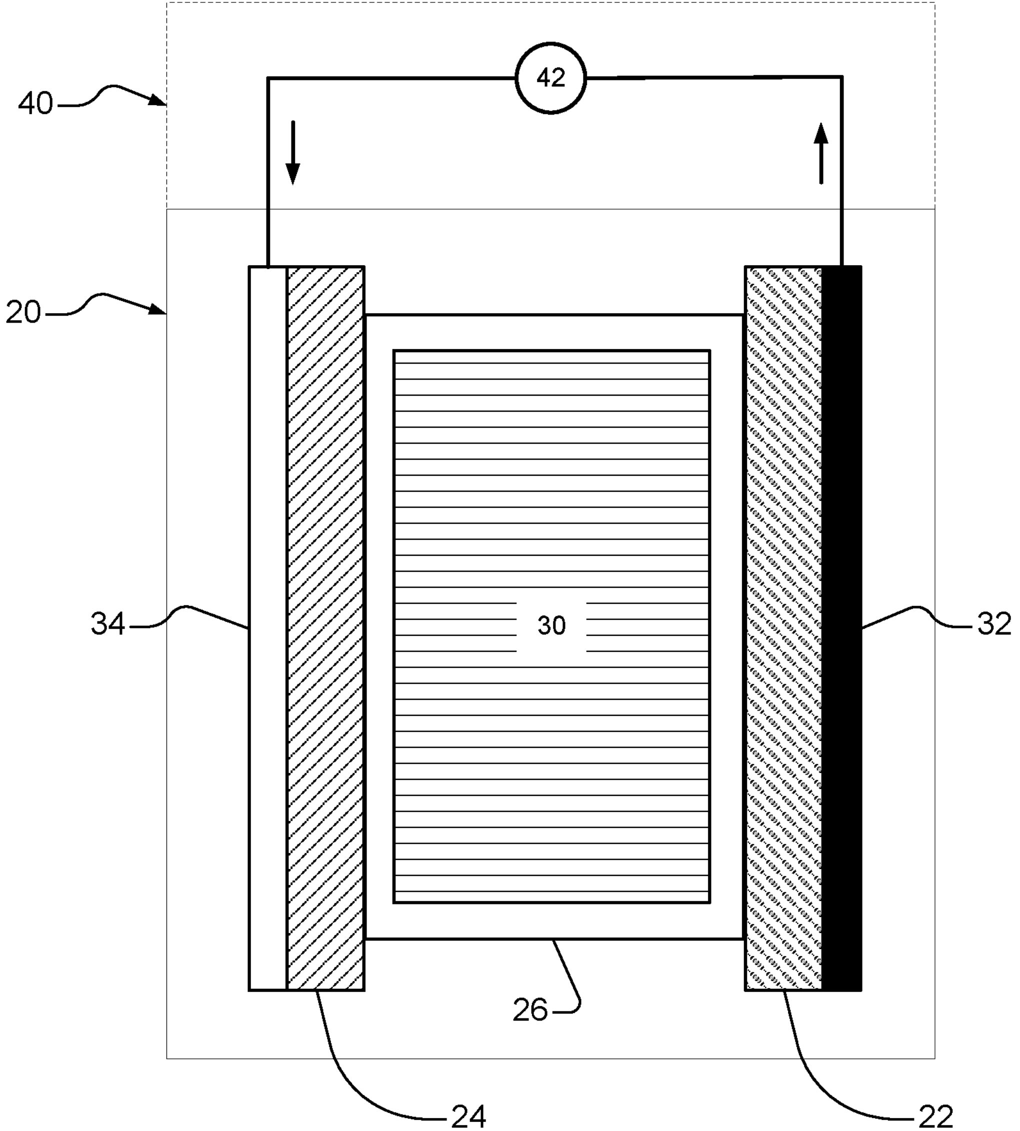
FIG. 1 is a schematic of an example electrochemical battery cell including a layered electroactive material in accordance with various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected, or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates both exactly or precisely the stated numerical value, and also, that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology relates to electrochemical cells including layered anode materials and to methods of using and forming the same. The layered anode material may be a two-dimensional ("2D"), layered silicon allotrope, and in certain variations, the layered anode material may be prelithiated. Methods for forming the layered anode material may include removing cations from a precursor material using solution phase reactions or wet chemistry methods. The precursor material may be an ionic compound (for example, represented by $MX_2$, where M is one of calcium (Ca) and magnesium (Mg) and X is one of silicon (Si), germanium (Ge), and/or boron (B)) that includes alternating layers such that the cations (e.g., $Ca^{2+}$) can be easily removed. For example, the precursor material may include $CaSi_2$, which is a compound including alternating layers of silicon and calcium. When the cations (e.g., $Ca^{2+}$) are removed, a two-dimensional, layered crystal remains. In certain variations, the layered anode material may be prelithiated by moving, for example, simultaneously, lithium ions (Lit) into the interlayer spaces or voids created by the removal of the cation via the solution phase reactions or wet chemistry reactions.

The electrochemical cells including layered anode materials can be used in vehicle or automotive transportation applications (e.g., motorcycles, boats, tractors, buses, motorcycles, mobile homes, campers, and tanks). However, the present technology may also be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. Further, although the illustrated examples detail below include a single positive electrode cathode and a single anode, the skilled artisan will recognize that the present teachings also extend to various other configurations, including those having one or more cathodes and one or more anodes, as well as various current collectors with electroactive layers disposed on or adjacent to one or more surfaces thereof.

An exemplary and schematic illustration of an electrochemical cell (also referred to as a battery) 20 is shown in FIG. 1. The battery 20 includes a negative electrode 22 (e.g., anode), a positive electrode 24 (e.g., cathode), and a separator 26 disposed between the two electrodes 22, 24. The separator 26 provides electrical separation—prevents physical contact—between the electrodes 22, 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the solid-state interlayer 50, the negative electrode 22, and/or the positive electrode 24, so as to form a continuous electrolyte network. In certain variations, the separator 26 may be formed by a solid-state electrolyte or a semi-solid-state electrolyte (e.g., gel electrolyte). For example, the separator 26 may be defined by a plurality of solid-state electrolyte particles. In the instance of solid-state batteries and/or semi-solid-state batteries, the positive electrode 24 and/or the negative electrode 22 may include a plurality of solid-state electrolyte particles. The plurality of solid-state electrolyte particles included in, or defining, the separator 26 may be the same as or different from the plurality of solid-state electrolyte particles included in the positive electrode 24 and/or the negative electrode 22.

A first current collector 32 (e.g., a negative current collector) may be positioned at or near the negative electrode 22. The first current collector 32 may be a metal foil, metal grid or screen, or expanded metal comprising copper or any other appropriate electrically conductive material known to those of skill in the art. A second current collector 34 (e.g., a positive current collector) may be positioned at or near the positive electrode 24. The second electrode current collector 34 may be a metal foil, metal grid or screen, or expanded metal comprising aluminum or any other appropriate electrically conductive material known to those of skill in the art. The first current collector 32 and the second current collector 34 may respectively collect and move free electrons to and from an external circuit 40. For example, an interruptible external circuit 40 and a load device 42 may connect the negative electrode 22 (through the first current collector 32) and the positive electrode 24 (through the second current collector 34).

The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The chemical potential difference between the positive electrode 24 and the negative electrode 22 drives electrons produced by a reaction, for example, the oxidation of intercalated lithium, at the negative electrode 22 through the external circuit 40 toward the positive electrode 24. Lithium ions that are also produced at the negative electrode 22 are concurrently transferred through the electrolyte 30 contained in the separator 26 toward the positive electrode 24. The electrons flow through the external circuit 40 and the lithium ions migrate across the separator 26 containing the electrolyte 30 to form intercalated lithium at the positive electrode 24. As noted above, the electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back toward the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the first current collector 32, negative electrode 22, separator 26, positive electrode 24, and second current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 shown in FIG. 1 includes a liquid electrolyte 30 and shows representative concepts of battery operation. However, the present technology also applies to solid-state batteries and/or semi-solid state batteries that include solid-state electrolytes and/or solid-state electrolyte particles and/or semi-solid electrolytes and/or solid-state electroactive particles that may have different designs as known to those of skill in the art.

The size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the lithium-ion battery 20. For example, in certain aspects, the electrolyte 30 may be a non-aqueous liquid electrolyte solution (e.g., >1 M) that includes a lithium salt dissolved in an organic solvent or a mixture of organic solvents. Numerous conventional non-aqueous liquid electrolyte 30 solutions may be employed in the battery 20.

A non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide ($LiN(FSO_2)_2$) (LiSFI), and combinations thereof. These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof.

The porous separator 26 may include, in certain instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of polyethylene (PE) and polypropylene (PP), or multi-layered structured porous films of PE and/or PP. Commercially available polyolefin porous separator membranes 26 include CELGARD® 2500 (a monolayer polypropylene separator) and CELGARD® 2320 (a trilayer polypropylene/polyethylene/polypropylene separator) available from Celgard LLC.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics.

In certain aspects, the separator 26 may further include one or more of a ceramic material and a heat-resistant material. For example, the separator 26 may also be admixed with the ceramic material and/or the heat-resistant material, or one or more surfaces of the separator 26 may be coated with the ceramic material and/or the heat-resistant material. In certain variations, the ceramic material and/or the heat-resistant material may be disposed on one or more sides of the separator 26. The ceramic material may be selected from the group consisting of: alumina ($Al_2O_3$), silica ($SiO_2$), and combinations thereof. The heat-resistant material may be selected from the group consisting of: Nomex, Aramid, and combinations thereof.

Various conventionally available polymers and commercial products for forming the separator 26 are contemplated, as well as the many manufacturing methods that may be employed to produce such a microporous polymer separator 26. In each instance, the separator 26 may have an average thickness greater than or equal to about 1 μm to less than or equal to about 50 μm, and in certain instances, optionally greater than or equal to about 1 μm to less than or equal to about 20 μm.

In various aspects, the porous separator 26 and/or the electrolyte 30 disposed in the porous separator 26 as illustrated in FIG. 1 may be replaced with a solid-state electrolyte ("SSE") layer and/or semi-solid-state electrolyte (e.g., gel) layer that functions as both an electrolyte and a separator. The solid-state electrolyte layer and/or semi-solid-state electrolyte layer may be disposed between the positive electrode 24 and negative electrode 22. The solid-state electrolyte layer and/or semi-solid-state electrolyte layer facilitates transfer of lithium ions, while mechanically separating and providing electrical insulation between the negative and positive electrodes 22, 24. By way of non-limiting example, the solid-state electrolyte layer and/or semi-solid-state electrolyte layer may include a plurality of solid-state electrolyte particles, such as $LiTi_2(PO_4)_3$, $LiGe_2(PO_4)_3$, $Li_7La_3Zr_2O_{12}$, $Li_{3x}La_{2/3-x}TiO_3$, $Li_3PO_4$, $Li_3N$, $Li_4GeS_4$, $Li_{10}GeP_2S_{12}$, $Li_2S—P_2S_5$, $Li_6PS_5Cl$, $Li_6PS_5Br$, $Li_6PS_5I$, $Li_3OCl$, $Li_{2.99}Ba_{0.005}ClO$, or combinations thereof. The semi-solid-state electrolyte layer may include a polymer host and a liquid electrolyte. The polymer host may include, for example, polyvinylidene fluoride (PVDF), polyvinylidene fluoride-hexafluoropropylene (PVDF-HFP), polyethylene oxide (PEO), polypropylene oxide (PPO), polyacrylonitrile (PAN), polymethacrylonitrile (PMAN), polymethyl methacrylate (PMMA), carboxymethyl cellulose (CMC), poly(vinyl alcohol) (PVA), polyvinylpyrrolidone (PVP), and combinations thereof. In certain variations, the semi-solid or gel electrolyte may also be found in the positive electrode 24 and/or the negative electrodes 22.

The positive electrode 24 may be formed from a lithium-based active material that is capable of undergoing lithium intercalation and deintercalation, alloying and dealloying, or plating and stripping, while functioning as the positive terminal of a lithium-ion battery. The positive electrode 24 can be defined by a plurality of electroactive material particles. Such positive electroactive material particles may be disposed in one or more layers so as to define the three-dimensional structure of the positive electrode 24. The electrolyte 30 may be introduced, for example after cell assembly, and contained within pores of the positive electrode 24. In certain variations, the positive electrode 24 may include a plurality of solid-state electrolyte particles. In each instance, the positive electrode 24 may have an average thickness greater than or equal to about 1 μm to less than or equal to about 500 μm, and in certain aspects, optionally greater than or equal to about 10 μm to less than or equal to about 200 μm.

In various aspects, the positive electroactive material includes a layered oxide represented by $LiMeO_2$, where Me is a transition metal, such as cobalt (Co), nickel (Ni), manganese (Mn), iron (Fe), aluminum (Al), vanadium (V), or combinations thereof. In other variations, the positive electroactive material includes an olivine-type oxide represented by $LiMePO_4$, where Me is a transition metal, such as cobalt (Co), nickel (Ni), manganese (Mn), iron (Fe), aluminum (Al), vanadium (V), or combinations thereof. In still other variations, the positive electroactive material includes a monoclinic-type oxide represented by $Li_3Me_2(PO_4)_3$, where Me is a transition metal, such as cobalt (Co), nickel (Ni), manganese (Mn), iron (Fe), aluminum (Al), vanadium (V), or combinations thereof. In still other variations, the positive electroactive material includes a spinel-type oxide represented by $LiMe_2O_4$, where Me is a transition metal, such as cobalt (Co), nickel (Ni), manganese (Mn), iron (Fe), aluminum (Al), vanadium (V), or combinations thereof. In still other variations, the positive electroactive material includes a tavorite represented by $LiMeSO_4F$ and/or $LiMePO_4F$, where Me is a transition metal, such as cobalt (Co), nickel (Ni), manganese (Mn), iron (Fe), aluminum (Al), vanadium (V), or combinations thereof. In still further variations, the positive electroactive material includes a combination of positive electroactive materials. For example, the positive electrode 24 may include one or more layered oxides, one or more olivine-type oxides, one or more monoclinic-type oxides, one or more spinel-type oxide, one or more tavorite, or combinations thereof.

In certain variations, the positive electroactive material may be optionally intermingled (e.g., slurry casted) with an electronically conductive material that provide an electron conductive path and/or a polymeric binder material that improve the structural integrity of the positive electrode 24. For example, the positive electrode 24 may include greater than or equal to about 30 wt. % to less than or equal to about 98 wt. %, and in certain aspects, optionally greater than or equal to about 60 wt. % to less than or equal to about 95 wt. %, of the positive electroactive material; greater than or equal to 0 wt. % to less than or equal to about 30 wt. %, and in certain aspects, optionally greater than or equal to about 0.5 wt. % to less than or equal to about 10 wt. %, of the electronically conducting material; and greater than or equal to 0 wt. % to less than or equal to about 20 wt. %, and in certain aspects, optionally greater than or equal to about 0.5 wt. % to less than or equal to about 10 wt. %, of the polymeric binder.

Example polymeric binders include polyimide, polyamic acid, polyamide, polysulfone, polyvinylidene difluoride (PVdF), polytetrafluoroethylene (PTFE), polytetrafluoroethylene (PTFE) copolymers, polyacrylic acid (PAA), blends of polyvinylidene fluoride and polyhexafluoropropene, polychlorotrifluoroethylene, ethylene propylene diene monomer (EPDM) rubber, carboxymethyl cellulose (CMC), a nitrile butadiene rubber (NBR), styrene-butadiene rubber (SBR), lithium polyacrylate (LiPAA), sodium polyacrylate (NaPAA), sodium alginate, and/or lithium alginate. Electronically conducting materials may include, for example, carbon-based materials, powdered nickel or other metal particles, or a conductive polymer. Carbon-based materials may include, for example, particles of graphite, acetylene black (such as KETCHEN™ black or DENKA™ black), carbon nanofibers and nanotubes (e.g., single wall carbon nanotubes (SWCNT), multiwall carbon nanotubes (MWCNT)), graphene (e.g., graphene platelets (GNP), oxidized graphene platelets), conductive carbon blacks (such as, SuperP (SP)), and the like. Examples of a conductive polymer include polyaniline, polythiophene, polyacetylene, polypyrrole, and the like.

The negative electrode 22 may be formed from a lithium host material that is capable of functioning as a negative terminal of a lithium-ion battery. In various aspects, the negative electrode 22 may be defined by a plurality of negative electroactive material particles. Such negative electroactive material particles may be disposed in one or more layers so as to define the three-dimensional structure of the negative electrode 22. The electrolyte 30 may be introduced, for example after cell assembly, and contained within pores of the negative electrode 22. For example, in certain variations, the negative electrode 22 may include a plurality of solid-state electrolyte particles. In each instance, the negative electrode 22 (including the one or more layers) may have a thickness greater than or equal to about 0 nm to less than or equal to about 500 μm, optionally greater than or equal to about 1 μm to less than or equal to about 500 μm, and in certain aspects, optionally greater than or equal to about 10 μm to less than or equal to about 200 μm.

In various aspects, the negative electroactive material includes an atomically layered anode material, where each crystallographic plane is considered a layer. The atomically layered anode material may include silicon (Si), germanium (Ge), and/or boron (B). For example, the electroactive material may include a two-dimensional, layered allotrope of silicon (Si), germanium (Ge), and/or boron (B) including planes of atoms strongly bound in-plane and weakly coupled out of plane (i.e., little to no bonding between layers) at an angstrom scale, similar to graphite. In other words, the atomically layered anode material may include silicene, a multi-layered silicene, germanene, a multi-layered germanene, borophene, a multilayer borophene, or any combination thereof. The atomically layered anode material may form micro/nano scale electroactive material particles, for example electroactive material particles having an average diameter greater than or equal to about 100 nm to less than or equal to about 50 μm.

Such negative electroactive materials may exhibit improve cyclability, for example, the two-dimensional silicon oxide negative electroactive materials may have an intrinsic capacity of about 1400 mAh/g at about 100 mA/g current. The layered structure may serve to relieve internal stresses that arise during lithiation and enhance ionic diffusion within the negative electrode 22. For example, the two-dimensional structure may allow lithium ions to intercalate between the layers via pseudo van der Waals gaps, to store lithium ions (e.g., pre-lithiated) without destroying the lattice structure thereby helping to avoid pulverization or decrepitation of the structure (similar to intercalation of lithium in graphite). Additionally, the two-dimensional channels formed between layers may better facilitate ionic diffusion to permit faster charge rates.

In various aspects, the negative electroactive material may be a composite include a combination of the layered anode material (e.g., silicene, germanene, and/or borophene) in the form, for example, of a first plurality of electroactive material particles, and an other negative electroactive material, such as graphite, graphene, carbon nanotubes, carbon nanofibers, carbon black, or any combination thereof in the form, for example, of a second plurality of electroactive material particles. In certain variations, the composite may include greater than or equal to about 5 wt. % to less than or equal to about 95 wt. % of layered anode material, and greater than or equal to about 5 wt. % to less than or equal to about 95 wt. % of the other negative electroactive material.

In still further variations, the negative electroactive material may be a composite include a combination of the two-dimensional, layered allotrope (e.g., silicene, germanene, and/or borophene) in the form, for example, of a first plurality of electroactive material particles, and an other negative electroactive material, such as a three-dimensional, layered allotrope (e.g., $SiO_x$ and $Li_xSiO_x$) in the form, for example, of a second plurality of electroactive material particles. For example, the composite may include greater than or equal to about 5 wt. % to less than or equal to about 95 wt. % of the two-dimensional, layered silicon allotrope, and greater than or equal to about 5 wt. % to less than or equal to about 95 wt. % of the three-dimensional, layered silicon allotrope.

In each instance, the negative electroactive material may be pre-lithiated, prior to (i.e., ex-situ) or after (i.e., in-situ) incorporation into the negative electrode 22 and/or battery 20, so as to compensate for lithium losses during cycling, such as may result during conversion reactions and/or the formation of $Li_xSi$ and/or a solid electrolyte interphase (SEI) layer (not shown) on the negative electrode 22 during the first cycle, as well as ongoing lithium loss due to, for example, continuous solid electrolyte interphase (SEI) formation. In certain variations, as detailed below, the layered anode material may be pre-lithiated during formation. In each instance, the layered anode material may have a lithium loading that is greater than or equal to about 20 wt. %.

In certain variations, the negative electroactive material may be optionally intermingled (e.g., slurry casted) with an electronically conductive material that provide an electron conductive path and/or a polymeric binder material that improve the structural integrity of the negative electrode 22. For example, the negative electrode 22 may include greater than or equal to about 30 wt. % to less than or equal to about 98 wt. %, and in certain aspects, optionally greater than or equal to about 60 wt. % to less than or equal to about 95 wt. %, of the negative electroactive material; greater than or equal to 0 wt. % to less than or equal to about 30 wt. %, and in certain aspects, optionally greater than or equal to about 0.5 wt. % to less than or equal to about 10 wt. %, of the electronically conducting material; and greater than or equal to 0 wt. % to less than or equal to about 20 wt. %, and in certain aspects, optionally greater than or equal to about 0.5 wt. % to less than or equal to about 10 wt. %, of the polymeric binder. The electronically conducting material and/or polymeric binder as included in the negative electrode 22 may be the same as or different from the electronically conducting material and/or polymeric binder as included in the positive electrode 24.

In various aspects, the present disclosure provides methods of making a layered anode material (e.g., two-dimensional, layered silicon allotrope), and more specifically, pre-lithiated, layered anode materials, for use in negative electrodes, like negative electrode 22 illustrated in FIG. 1. In certain variations, the present disclosure contemplates one-step methods for preparing pre-lithiated, layered anode materials using solution phase reactions. In other variations, the present disclosure contemplates two-step methods for preparing pre-lithiated, layered anode materials using wet chemical methods. In each instance, the methods may be performed using, for example only, batch processes or continuous processes (such as, roll-to-roll processes).

Figure 2:
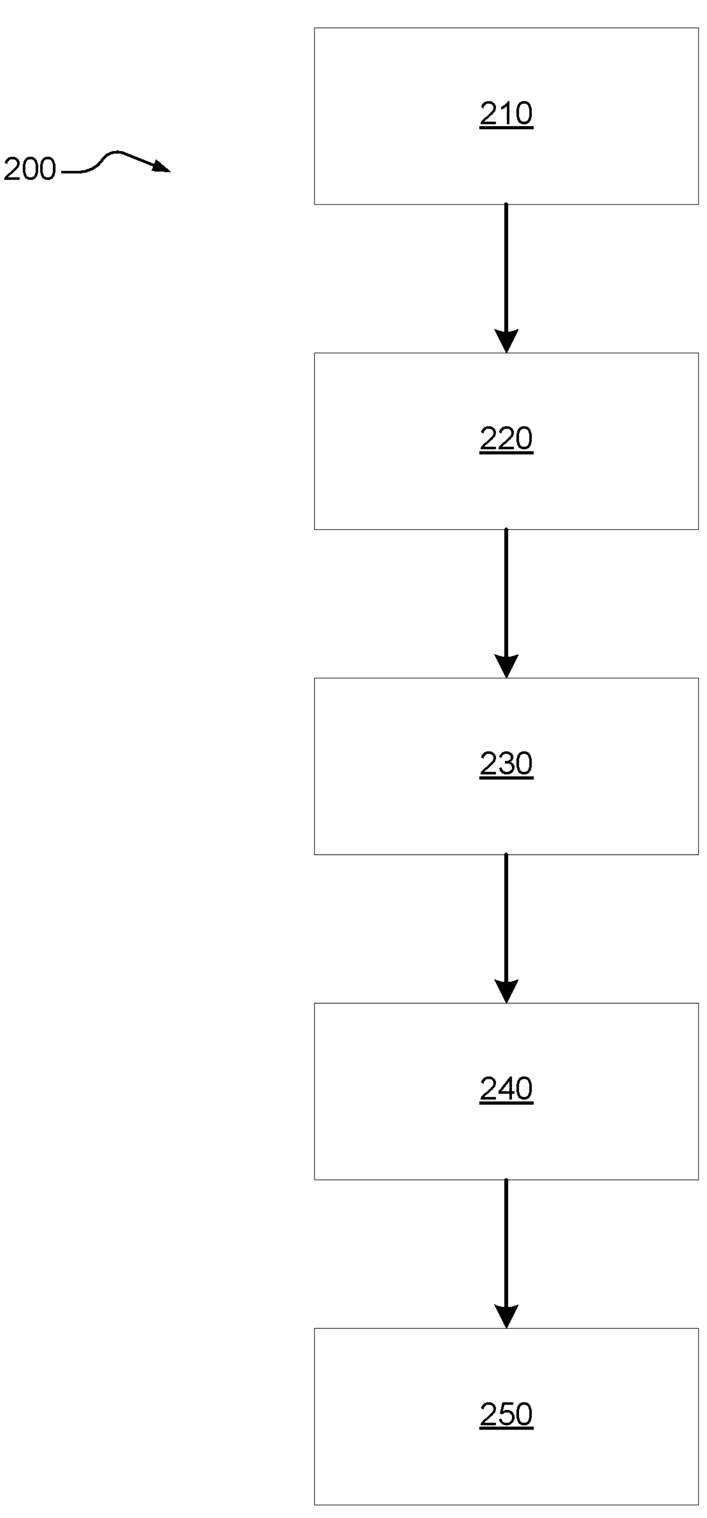
FIG. 2 is a flowchart illustrating an example one-step method for fabricating a pre-lithiated, layered anode material for use in an electrochemical battery cell, like the example electrochemical battery cell illustrated in FIG. 1, in accordance with various aspects of the present disclosure.

FIG. 2 illustrates an example one-step method 200 for preparing a pre-lithiated layered anode material. The method 200 may include contacting 220 a buffer solution to a precursor material to activate and remove the original cations from the precursor material while simultaneously inserting lithium ions ($Li^+$) to form the pre-lithiated layered anode material in a lithium-rich solution. The method 200 may occur at temperatures greater than or equal to about −20° C. to less than or equal to about 200° C. The buffer solution may include one or more lithium ion precursors and one or more weak bases (e.g., alcohols, ammonia hydroxide) in dimethyl carbonate (DMC) or other solvent (e.g., acetonitrile). For example, the buffer solution may include greater than or equal to about 15 wt. % to less than or equal to about 35 wt. % of the one or more lithium ion precursors, and greater than or equal to about 20 wt. % to less than or equal to about 50 wt. % of the one or more solvents The one or more lithium ion precursors may include, for example, lithium hydroxide (LiOH), lithium chloride (LiCl), lithium methoxide ($LiCH_3O$), lithium ethoxide ($LiOC_2H_5$), and/or lithium nitrate ($LiNO_3$). The one or more alcohols may include, for example, ethanol, methanol, and/or isopropanol. The precursor material may be an ionic compound represented by $MX_2$, where M is one of calcium (Ca) and magnesium (Mg) and X is one of silicon (Si), germanium (Ge), and/or boron (B). In each instance, the precursor material includes alternating layers, with a degree of ionic bonding that allows the cations (M) to be easily removed by solvation. For example, in certain variations, the reaction may be represented by $CaSi_2+LiCl \rightarrow LiSi+CaCl_2$.

For example, in certain variations, the precursor material may include $CaSi_2$, which is a compound including alternating atomic layers of silicon and calcium. When contacted to the buffer solution the one or more alcohol may induce extraction of the calcium ions ($Ca^{2+}$) and simultaneous lithium ion (Lit) intercalation with, for example, $^-OH$ and $^-Cl$ counter ions. This process may cause substantially all, or in certain variations, optionally greater than or equal to about 85%, optionally greater than or equal to about 90%, optionally greater than or equal to about 95%, optionally greater than or equal to about 96%, optionally greater than or equal to about 97%, optionally greater than or equal to about 98%, optionally greater than or equal to about 99%, or optionally, greater than or equal to about 99.5%, of the cations (e.g., $Ca^{2+}$) to be removed from the precursor material and replaced with lithium ion ($Li^+$).

In certain variations, the method 200 may further include preparing 210 the buffer solution, for example, by contacting the lithium hydroxide (LiOH), lithium chloride (LiCl), and one or more alcohols to the dimethyl carbonate (DMC) or other solvent. The method 200 may also include rinsing 230 the pre-lithiated layered anode material with dimethyl carbonate (DMC) or other solvent to remove residual lithium ion precursors, and also, cation-containing content or solution and other unwanted reaction products. The cation-containing solution may have a pH of greater than or equal to about 9. The method 200 may also include treating 240 the pre-lithiated layered anode material to remove residual solution. The treating 240 may include, for example, applying a vacuum at a mild temperature (e.g., greater than or equal to about 25° C. to less than or equal to about 80° C.) to evaporate the residual buffer solution. In certain variations, the method 200 further includes contacting 250 the pre-lithiated layered anode material with a polymeric binder and/or conductive material to form a negative electrode.

Figure 3:
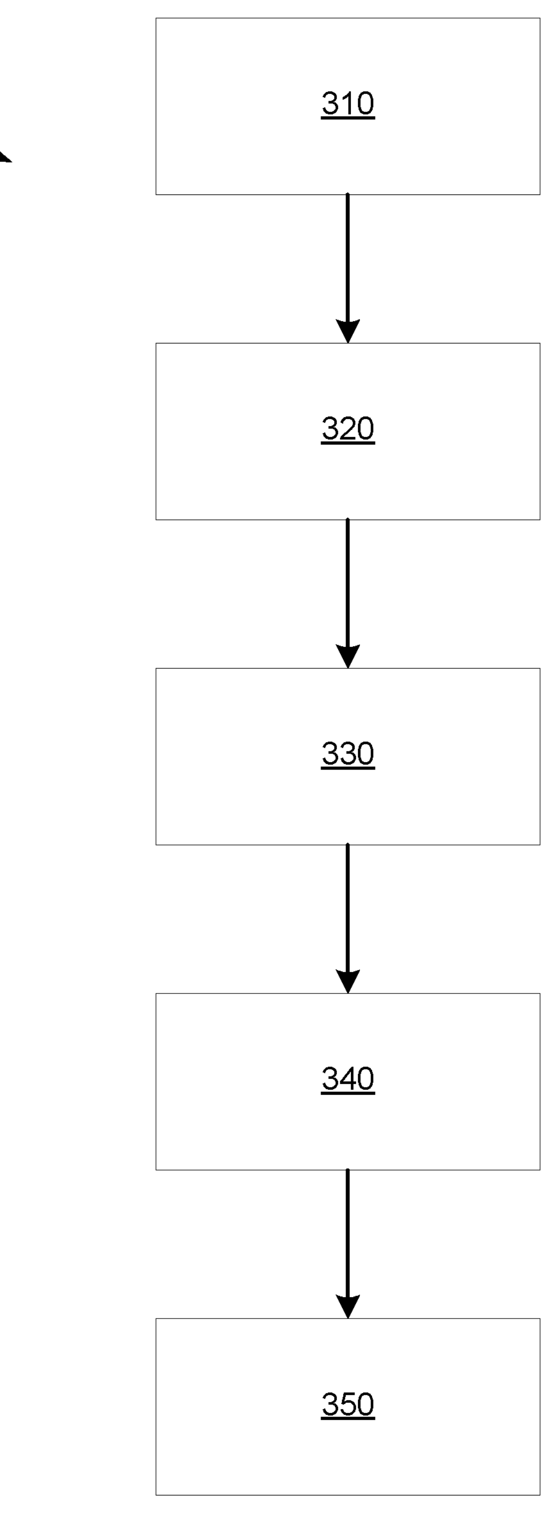
FIG. 3 is a flowchart illustrating an example two-step method for fabricating a pre-lithiated, layered anode material for use in an electrochemical battery cell, like the example electrochemical battery cell illustrated in FIG. 1, in accordance with various aspects of the present disclosure.

FIG. 3 illustrates an example two-step method 300 for preparing a pre-lithiated layered anode material. The method 300 may include contacting 320 a precursor material with an acidic solution to remove cations from the precursor material while maintaining or preserving a layered structure. In certain variations, the method may include preparing 310 the acidic solution. The acidic solution may include, for example, hydrochloric acid (HCl) and/or nitric acid ($HNO_3$). In each instance, the acidic solution may have a pH less than or equal to about 1. As in the instance of method 200, the precursor material may be an ionic compound includes alternating layers and represented by $MX_2$, where M is one of calcium (Ca) and magnesium (Mg) and X is one of silicon (Si), germanium (Ge), and/or boron (B). For example, in certain variations, the precursor material may include $CaCl_2$, and the acid treatment reaction may be represented by $3\ CaSi_2+6\ HX \rightarrow Si_6H_6+3\ CaX_2$, where x is chloride (Cl) or fluoride (F), for example. That is, cations of the precursor material are replaced with hydrogen ions ($H^+$). This process may cause substantially all, or in certain variations, optionally greater than or equal to about 85%, optionally greater than or equal to about 90%, optionally greater than or equal to about 95%, optionally greater than or equal to about 96%, optionally greater than or equal to about 97%, optionally greater than or equal to about 98%, optionally greater than or equal to about 99%, or optionally, greater than or equal to about 99.5%, of the cations (e.g., $Ca^{2+}$) to be removed from the precursor material. The method 300 may occur at temperatures greater than or equal to about −20° C. to less than or equal to about 200° C.

The method 300 further includes contacting 340 the layered structure with a basic or buffer solution to form the pre-lithiated layered anode material. In certain variations, the method may include preparing 330 the basic solution. The basic solution may be a lithium-containing base including one or more lithium ion precursors. For example, the lithium-ion precursor may include LiOH, $LiOCH_3$, $LiOC_2H_5$, and combinations thereof. In each instance, the basic solution may have a pH greater than or equal to about 10. The contacting of the basic solution to the layered structure may induce a neutralizing reaction where acidic species of the layered structure react with the basic species of the basic solution, which acts as a driving force for the intercalation of lithium ion (Li+) into the layered structure. For example, the neutralizing reaction may be represented by: $Si_6H_6+6\ LiOH \rightarrow Si_6Li_6+6\ H_2O$. In certain variations, the method 300 further includes contacting 350 the pre-lithiated layered anode material with a polymeric binder and/or conductive material to form a negative electrode.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for forming a pre-lithiated layered anode material, the method comprising:

removing cations from a precursor material using a cation extraction wet-chemical process, the precursor material comprising a layered ionic compound and the removing cations creating a two-dimensional structure that defines a layered anode material; and inserting lithium ions using an anion insertion wet-chemical process into the layered anode materials to form the pre-lithiated layered anode material, [the anion insertion wet-chemical process being the same as or different form the cation extraction wet-chemical process, the cation extraction wet-chemical process and the anion insertion wet-chemical process being the same or different, when the cation extraction wet-chemical process and the anion insertion wet-chemical process are the same, the cation extraction wet-chemical process and the anion insertion wet-chemical process comprise contacting the precursor material with a buffer solution that comprises a lithium ion precursor and an alcohol, the contacting of the precursor material to the buffer solution causing the cations to be removed from the precursor material to form the layered anode material and lithium ions to concurrently move into the layered anode material to form the pre-lithiated layered anode material, and rising the pre-lithiated layered anode material with a solvent to remove residual lithium ion precursor and the cations,]

when the cation extraction wet-chemical process and the anion insertion wet-chemical process are different, the cation extraction wet-chemical process comprises contacting the precursor material with acidic solution to remove cations from the precursor material to form the layered anode material, and the anion insertion wet-chemical process comprises contacting the layered anode material with a basic solution having a pH greater than or equal to about 10 and comprising a lithium ion precursor to form the pre-lithiated layered anode material.

2. The method of claim 1, wherein the precursor material is represented by $MX_2$, where M is one of calcium (Ca) and magnesium (Mg) and X is one of silicon (Si), germanium (Ge), and boron (B) and the precursor material has alternating layers of M and X.

3. The method of claim 1, wherein the lithium ion precursor is selected from the group consisting of: lithium hydroxide (LiOH), lithium chloride (LiCl), lithium methoxide ($LiCH_3O$), lithium ethoxide ($LiOC_2H_5$), lithium nitrate ($LiNO_3$), and combinations thereof.

4. The method of claim 1, wherein the method further comprises:

applying a vacuum at a temperature greater than or equal to about 25° C. to less than or equal to about 80° C. to the pre-lithiated layered anode material to remove residual solvent.

5. The method of claim 1, wherein the acidic solution has a pH less than or equal to about 1.

6. The method of claim 5, wherein the acidic solution comprises hydrochloric acid (HCl), nitric acid ($HNO_3$), or a combination of hydrochloric acid (HCl) and nitric acid ($HNO_3$).

7. A method for forming a pre-lithiated layered anode material, the method comprising:

contacting a precursor material comprising a layered ionic compound with an acidic solution to remove cations and form a layered anode material, the acidic solution having a pH less than or equal to about 1; and contacting the layered anode material with a basic solution comprising a lithium ion precursor to form the pre-lithiated layered anode material, the basic solution having a pH greater than or equal to about 10.

8. The method of claim 7, wherein the acidic solution comprises hydrochloric acid (HCl), nitric acid ($HNO_3$), or a combination of hydrochloric acid (HCl) and nitric acid ($HNO_3$), and the lithium ion precursor is selected from the group consisting of: lithium hydroxide (LiOH), lithium chloride (LiCl), lithium methoxide ($LiCH_3O$), lithium ethoxide ($LiOC_2H_5$), lithium nitrate ($LiNO_3$), and combinations thereof.

* * * * *